Aug. 20, 1935.  J. R. RITCHIE  2,011,777
SIDE BLADE ATTACHMENT FOR TRUCKS
Filed June 23, 1934
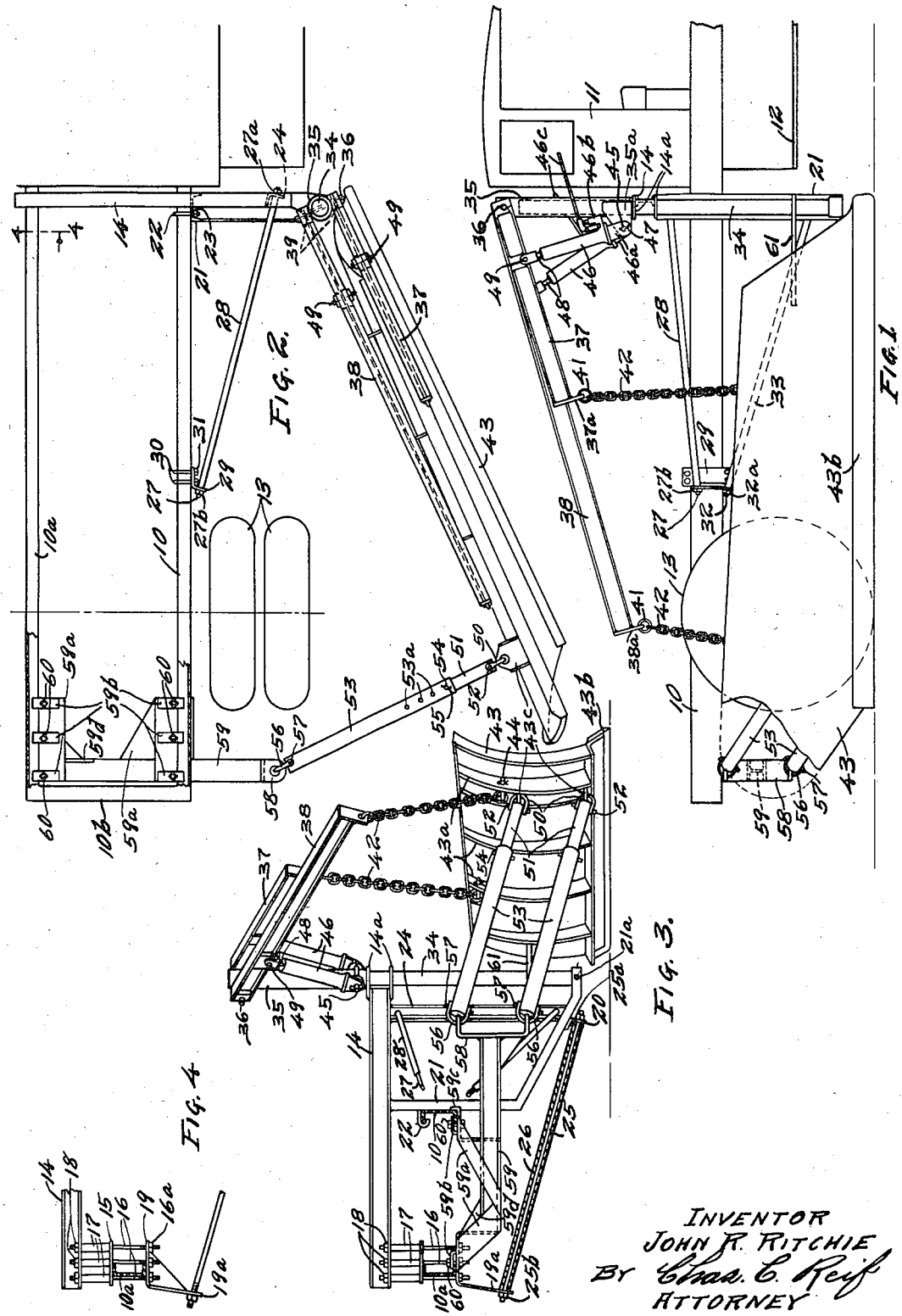
INVENTOR
JOHN R. RITCHIE
BY Chas. C. Reif
ATTORNEY Patented Aug. 20, 1935

2,011,777

UNITED STATES PATENT OFFICE 2,011,777

SIDE BLADE ATTACHMENT FOR TRUCKS

John Reid Ritchie, Minneapolis, Minn.

Application June 23, 1934, Serial No. 732,098

11 Claims. (Cl. 37—42)

This invention relates to a machine for moving earth or similar material and while the machine is capable of various uses and applications, it particularly is designed as an attachment adapted to be secured to a standard vehicle such as a truck, to form an earth moving or snow moving machine.

Most highway departments and contractors at the present day have among their equipment a number of trucks. It is desirable to have an attachment which can be readily attached to the truck frame and which will form an earth moving, snow removing or road scraping machine, which, of course, is propelled by the power of the truck. With light work such a machine can be operated at considerable speed.

It is desirable with such a machine as above set forth to have a blade by which the material is moved, together with means for adjusting the blade to various angles as well as means for raising the blade when desired.

It is an object of this invention, therefore, to provide a simple and efficient device which can readily be attached to and detached from a truck or other vehicle and which comprises a snow moving blade and means for adjusting said blade to various angles and means for raising said blade.

It is another object of the invention to provide a device having means constructed and arranged to be attached to the frame of a truck or similar vehicle and to extend to one side thereof, one of said means having mounted therein a member oscillatable about a vertical axis together with one or more members carried by said member and movable about a horizontal axis and from which a blade is suspended, means being also provided for raising said last mentioned member or members to raise said blade.

It is still another object of the invention to provide a device comprising means constructed and arranged to be attached to the frame of a truck or similar vehicle adjacent the forward end thereof, means constructed and arranged to be attached to the frame of said truck or other vehicle adjacent the rear end thereof, said means extending to one side of said frame and one of the same having mounted therein a post oscillatable about a vertical axis, one or more members being pivotally connected to said post adjacent its upper end and movable about a horizontal axis, said members having flexible means adjacent their ends, a blade suspended from said flexible means and means such as a hydraulic cylinder and piston connected to said post and to said members for moving the same about said horizontal axis to raise said blade, said means at the other end of said vehicle having a member connected thereto and connected to said blade.

These and other objects and advantages of the invention will be fully set forth in the following description made in connection with the accompanying drawing, in which like reference characters refer to similar parts throughout the several views and in which:—

Fig. 1 is a view in side elevation of the device, a portion being broken away and a portion of the truck being shown;

Fig. 2 is a plan view of the device, some parts of the truck also being shown and some parts of the device being broken away and others being shown in horizontal section; and Fig. 3 is a view in elevation of the device as seen from the rear end of the truck.

Fig. 4 is a vertical section taken on line 4—4 of Fig. 2.

Referring to the drawing, a portion of a vehicle such as a truck is shown, of which it will only be necessary to consider the longitudinally extending and spaced frame members 10 and 10a which are shown as connected by the rear end cross frame member 10b. The frame members 10 and 10a extend forwardly and support the driver's cab 11. A step 12 for entering the cab is also shown. The frame of the truck is as usual supported by the tire equipped wheels 13 as indicated in Figs. 1 and 2.

In accordance with the present invention a bar or beam 14 is provided which extends transversely of frame members 10 and 10a some distance above the same and extends a considerable distance to one side of one of said frame members. A plate 15 is disposed on frame member 10a and a plurality of bolts 16, shown as three in number, extend vertically through the plate 15 and through spacing tubes or thimbles 17 resting on top of said plate and on which beam 14 rests. Bolts 16 are threaded at their upper ends and equipped with the nuts 18 engaging the flange of beam 14 which is illustrated as an I-beam. It will be seen that two of the bolts 16 extend vertically at either side respectively of frame member 10a which is shown as a channel with the channel directed inwardly. One of the bolts 16 extends closely along the outer side of the channel while the other extends closely along the edges of the flanges. Bolts 16 at their lower ends extend through a plate 19 which is disposed below frame member 10a and against the lower side thereof. Said bolts 16 are threaded at their lower ends and equipped with nuts 16a which engage the lower side of plate 19.

A vertical channel bar 21 is secured at its upper end to cross beam 14 in any suitable manner as by riveting or welding and said bar 21 extends along the outer side of frame member 10 with its flanges directed outwardly, which frame member is also illustrated as a channel with its flanges directed inwardly. Bar 21 therefore extends close along the outer side of the web of frame member 10. A hook bolt 22 extends through bar 21 having its inner hooked end engaging over the top flange of frame member 10, the same being threaded to receive the clamping nut 23 disposed at the outer side of bar 21 as shown in Fig. 2. Bar 21 extends vertically some distance below frame member 10 and then extends laterally downwardly and outwardly and has a terminal portion extending horizontally at some distance outwardly from frame member 10. An angle bar 24 extends vertically downward from the bottom of beam 14, being secured thereto in any suitable manner and said bar extends downwardly and is secured to bar 21 adjacent its horizontal terminal portion. An angle bracket 20 is secured to bar 21 adjacent its bottom and is apertured to have extend therethrough the threaded end of a brace rod 25, said rod being equipped with a nut 25a at the outer side of bracket 20. Brace rod 25 extends transversely of the frame members 10 and 10a at a considerable distance below the same and has its other threaded end projecting through an aperture in a downwardly extending projection 19a of plate 19, this end of the bar also being equipped with a nut 25b. A pipe or tube 26 extends between and engages bracket 20 and projection 19a, rod 25 passing through said tube. Another brace rod 27 has one end extending through bar 24 adjacent beam 14 and equipped with a nut 27a, the other end of brace rod 27 extending through one flange of a clip bracket 29 and equipped with a nut 27b. A pipe or tube 28 extends between and engages bar 24 and bracket 29, rod 27 passing through tube 28. Bracket 29 is secured to the outer side of frame member 10 by two pairs of hook bolts 30 extending therethrough equipped with nuts 31 disposed at the outer side of bracket 29, said pairs of bolts having their hook portions extending respectively over the top and bottom flanges of frame member 10. Another brace rod 32 extends through the outwardly extending flange of bracket 29, being equipped with a nut 32a at one end, said rod also extending forwardly and downwardly and having its other end extending through one flange of bar 24 and equipped with a suitable nut (not shown). A pipe or tube 33 extends between and engages bar 24 and bracket 29, rod 32 passing through pipe 33. A vertical cylindrical post 34 is secured in the lower end of bar 21 as by pin 21a and extends vertically through and a considerable distance above plates 14a secured to the top and bottom of beam 14 at the outer end thereof. A sleeve 35 surrounds and is rotatable on post 34 above top plate 14a and rests thereon. Sleeve 35 has a pivot rod 36 extending therethrough adjacent its upper end, which rod also extends through a pair of bars 37 and 38 illustrated as I-beams, the same being disposed at opposite sides of said sleeve respectively. Said bars have blocks 39 disposed between the flanges thereof through which rod 36 passes and said rod is held in place by any suitable means such as cotter pins extending therethrough at the outer sides of said blocks. Bars 37 and 38 are thus pivoted to sleeve 35 and can swing about the horizontal axis of rod 36. Bar 38 is of considerably greater length than bar 37 and said bars have end flanges 37a and 38a at their free ends which extend below said bars and are apertured to receive rings or links 41 to which are connected flexible members such as the chains 42 and these chains are connected at their lower ends to the rear of a blade member 43. Blade member 43 as shown in Figs. 2 and 3 has a concave front surface curved about an axis extending longitudinally of said blade and said blade has at its rear side spaced plate-like ribs 43a extending vertically transversely thereof. A bar 43b having a beveled or sharpened edge is secured adjacent the lower edge of blade 43 and extends longitudinally thereof. Rods 44 extend through and between pairs of the ribs 43a and pass through the lower links on the chains 42. Sleeve 35 has lug-forming plates 35a secured to opposite sides thereof extending in parallel relation through which extends a pivot rod 45 which also passes through lugs 46a extending from the bottom of hydraulic cylinders 46, said lugs being disposed at the outer sides of plates 35a. Rod 45 is held in place by any suitable means such as the cotter pins 47. Cylinders 46 have the usual pistons therein connected to piston rods 48 having forks formed on their ends which embrace bars 37 and 38 and are pivoted thereto by the pivot rods 49. The cylinders 46 are adapted to contain a suitable liquid and form hydraulic jacks and this may be forced thereinto by pumps 46b which may be operated from any suitable source of power or mechanism such as the handles 46c. Bars 37 and 38 are preferably provided with blocks or lugs extending between the flanges thereof through which rods 49 pass. Lug-forming plates 43c extend between a pair of the ribs 43a and are apertured to receive the yokes 50, the spaced ends of which embrace bars 51 and are pivotally connected thereto by the pivot pins or rivets 52. Bars 51 are slidable in bars 53 and are equipped with holes adapted to receive rods or pins 54 which extend through alined holes 53a in the bars or tubes 53. Bars 53 are provided with a plurality of the holes 53a through any pair of which the pins 54 may be passed. Pins 54 may be held in place by any suitable means such as the cotter pins 55. Bars 53 are embraced at their other ends by yokes 56 which are pivoted thereto by the pins 57. Yokes 56 pass through apertures in vertically spaced horizontally projecting ends of a yoke-like bar 58 secured to one end of a bar or beam 59 which may be an H-beam and which extends transversely beneath the frame members 10 and 10a adjacent their rear ends. Bar 59 has plates 59a extending upwardly therefrom and having horizontal portions disposed below and in contact with the bottom of the lower flanges of frame members 10 and 10a. Said horizontal portions have lugs 59b with short vertical portions and longer horizontal portions, the latter of which overlie the lower flanges of frame members 10 and 10a. Bolts 60 extend through the lugs 59b and the horizontal portions of plates 59a and the lower flanges of frame members 10 and 10a are thus clamped between the lugs 59b and said horizontal portions. The horizontal portion of plate 59a shown at the right of Fig. 3 has a vertical flange 59c which extends along the outer side of frame member 10 and prevents lateral movement of bar 59. A gusset plate 59d extends from the top of bar 59 to the vertical portion of one plate 59a to reinforce the same. A plate 61 extends from the rear of blade 43, being welded to the same adjacent its inner end, and post 35 extends through an aperture in said plate.

In operation, members 14 and 59 will be attached to the truck frame at the forward and rear portions thereof as already described. The bars 53 and 51 will be adjusted by means of the pins 54 to give the desired angle to the blade 43. When the truck is operated to move along the road or other location the earth, snow or other material to be moved will be engaged by the blade 43 and moved therealong to its end. The blade 43 can be raised when desired by operating the pumps 46b which will elevate the plunger rods 48 and the bars 37 and 38, which bars form hoisting booms. These bars will swing about the axis of pivot rod 36 and lift the blade 43. At this time the bars 53 will swing about their pivotal connection with the plate or yoke member 58. The device is well braced so as to maintain its proper position. It will be seen that the device can be readily removed from the truck by removing bolts 16, 21, 31 and 60.

From the above description it is seen that applicant has provided a simple and efficient structure which can be readily attached to a standard truck to form an earth or snow moving combination. The device is so constructed that the blade 43 can be raised and lowered and adjusted without interfering in any way with the normal operation of a hydraulic dump body with which the truck may be provided. The parts are comparatively few and ruggedly made and the attachment to the truck and detachment therefrom can be quickly and expeditiously made. The device has been amply demonstrated in actual practice and found to be very successful and efficient.

It will, of course, be understood that various changes may be made in the form, details, arrangement and proportions of the parts, without departing from the scope of applicant's invention, which generally stated, consists in a device capable of carrying out the objects above set forth in the parts and combinations of parts disclosed and defined in the appended claims.

What is claimed is:—

1. An attachment for a highway truck having in combination, means adapted to be secured to the frame of the truck adjacent its forward end and projecting quite a distance to one side thereof, a member carried by said means adjacent its outer end and oscillatable about a vertical axis, means carried by said member extending outwardly and rearwardly therefrom and swingable about a horizontal axis adjacent said member, a blade suspended from said last mentioned means and extending rearwardly and outwardly, means comprising a hydraulic piston and plunger connected to said last mentioned means and first mentioned member for moving said last mentioned means about said horizontal axis and raising said blade and means for holding the outer end of said blade in operative position.

2. An attachment for a highway truck having in combination, a member adapted to be connected to the frame of said truck adjacent the forward end thereof and projecting at one side of said frame, a second member carried by said member adjacent its outer end and swingable about a vertical axis and a horizontal axis adjacent said end, a blade suspended from said member, means comprising a fluid cylinder and piston for moving said second member about said horizontal axis and raising said blade, a third member rigidly connected to the frame of said truck adjacent its rear end and means pivotally connecting said third member and blade adjacent the rear end of the latter.

3. An attachment for a highway truck having in combination, means adapted to be secured to the frame of said truck adjacent its forward end and projecting at one side thereof, a post mounted in said member adjacent its outer end, a sleeve on said post oscillatable thereon about a vertical axis, a pair of bars carried by said sleeve and pivoted thereto to swing about a horizontal axis, one of said bars being of greater length than the other, flexible means respectively connected to said members adjacent their ends, a blade to which said flexible members are connected and extending outwardly and rearwardly from adjacent said post, extensible means secured to said bars respectively at one end and to said sleeve at their other ends for raising said members and blade and means connected to said frame and to said blade adjacent the outer end of the latter.

4. An attachment for a highway truck having in combination, means adapted to be connected to the frame of said truck adjacent the forward end thereof and projecting at one side of said frame, a member carried by said means adjacent its outer end and oscillatable about a vertical axis, bars pivoted to said member above said means to swing about a horizontal axis, flexible means depending from said bars adjacent their free ends, a blade to which said flexible means are connected extensible means pivoted at one end to said member and at their other ends to said bars for raising said bars and blade and extensible means connecting said frame and said blade adjacent the outer end of the latter.

5. The structure set forth in claim 4, said last mentioned means comprising cylinders pivoted to said sleeve and plunger rods extending thereinto pivoted at their outer ends to said bars.

6. The combination with a highway truck having longitudinally extending spaced frame members, of a bar extending transversely of said frame members adjacent the forward end thereof, means rigidly and detachably securing said bar to said frame members, said bar projecting at one side of said truck, a vertical post mounted in said member, a sleeve oscillatable on said post adjacent its upper end, a pair of boom members pivoted to said sleeve on a pivot member extending horizontally of said sleeve, said boom members being of different lengths, flexible members depending from said boom members, a blade secured to said flexible members, extensible members pivoted to said boom members respectively and to said sleeve adapted to raise said bars and lift said blade, another bar extending transversely of said frame members adjacent the rear of the same, means detachably and rigidly securing said last mentioned bar to said frame members and an extensible and contractible member pivoted to said last mentioned bar and to said blade.

7. The structure set forth in claim 6, said first mentioned bar being disposed above said frame members and said last mentioned bar being disposed below said frame members.

8. In combination with a highway truck having longitudinally extending spaced frame members, of a bar extending transversely of said frame members adjacent the forward end thereof, means detachably and rigidly securing said bar to said frame members, said bar projecting some distance at one side of said frame members, a second bar secured to said first mentioned bar extending downwardly and outwardly therefrom, means securing said second bar to one of said frame members, a vertical post secured at its lower end to said second bar and extending to said first mentioned bar, a member oscillatably mounted on the upper end of said post, a pair of booms pivoted to said last mentioned member about a horizontal axis, a blade carried by said booms, extensible members pivoted at their upper ends to said booms and at their lower ends to said last mentioned member adapted to raise said booms and blade and means connected to said frame and to said blade adjacent the outer end of the latter for holding said blade in operative position.

9. The combination with the frame of a highway truck, of a member secured to and extending transversely of said frame adjacent the front end thereof and projecting a considerable distance at one side of said frame, a second member swingable about a vertical axis adjacent the outer end of said member, an elongated boom member pivoted adjacent the upper end of said second member to swing about a horizontal axis, a blade below said boom member extending outwardly and rearwardly from adjacent said second member, means connecting said blade and boom member for supporting said blade, an extensible and contractable means secured at its ends respectively to said second member and boom member for swinging said boom member about said horizontal axis and means connecting the outer end of said blade and frame.

10. The combination with the frame of a highway truck, of a member secured to and extending transversely of said frame adjacent the front end thereof and projecting a considerable distance at one side of said frame, a second member swingable about a vertical axis adjacent the outer end of said member, a pair of boom members pivotally connected to said second member to swing about a horizontal axis, a blade below said boom members extending outwardly and rearwardly, means connecting said blade to each of said boom members, extensible and contractable means connected to said second member and to said boom members respectively for raising and lowering said boom members and blade and extensible means connected to the rear end of said blade and to the rear end of said frame.

11. The combination with the frame of a highway truck, of a blade attachment comprising a member extending transversely of said frame adjacent the front thereof and projecting a considerable distance at one side of said frame, a post supported by said member adjacent its outer end, a second member extending vertically from said first mentioned member and secured to said frame, means extending downwardly and outwardly from said second member to said post and secured thereto adjacent the bottom thereof, a member carried by said post and swingable thereon about a vertical axis, a boom member pivotally connected to said last mentioned member to swing about a horizontal axis, a blade carried by said boom extending outwardly and rearwardly, means for raising and lowering said boom member and blade and means connected to said frame for holding the rear end of said blade in position.

JOHN REID RITCHIE.